(12) United States Patent
Willinger et al.

(10) Patent No.: US 8,960,130 B2
(45) Date of Patent: Feb. 24, 2015

(54) PET TOY

(75) Inventors: Jonathan Willinger, Tenafly, NJ (US);
Ryan Rutherford, Belleville, NJ (US);
Andrea Matz, Stanhope, NJ (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 12/877,320

(22) Filed: Sep. 8, 2010

(65) Prior Publication Data

US 2011/0192353 A1   Aug. 11, 2011

Related U.S. Application Data

(60) Provisional application No. 61/301,728, filed on Feb. 5, 2010.

(51) Int. Cl.
*A01K 29/00* (2006.01)
*A01K 11/00* (2006.01)

(52) U.S. Cl.
CPC ..................... *A01K 15/026* (2013.01)
USPC .......................................... 119/709; 119/707

(58) Field of Classification Search
USPC ............. 119/707, 709–711; 220/592.54, 739
See application file for complete search history.

(56) References Cited

U.S. PATENT DOCUMENTS

| | | | |
|---|---|---|---|
| 995,700 A * | 6/1911 | Maynard | 215/12.1 |
| 1,534,964 A * | 4/1925 | Kahnweiler | 119/711 |
| 4,223,636 A * | 9/1980 | Dishong | 119/709 |
| 4,816,000 A * | 3/1989 | Hsu | 446/74 |
| 5,476,408 A * | 12/1995 | Hoeting et al. | 446/419 |
| 5,560,320 A * | 10/1996 | Plunk | 119/709 |
| 5,738,232 A * | 4/1998 | Roberts et al. | 215/228 |
| 5,915,580 A * | 6/1999 | Melk | 215/386 |
| 6,112,703 A * | 9/2000 | Handelsman | 119/707 |
| 6,474,268 B1 * | 11/2002 | Suchowski et al. | 119/709 |
| 6,554,155 B1 * | 4/2003 | Beggins | 220/739 |
| 6,655,543 B2 * | 12/2003 | Beuke | 220/739 |
| 7,063,044 B2 * | 6/2006 | Handelsman et al. | 119/709 |
| 7,950,353 B2 * | 5/2011 | Axelrod et al. | 119/709 |
| 8,042,493 B2 * | 10/2011 | Jacobs | 119/709 |
| 8,579,133 B2 * | 11/2013 | Marcus et al. | 215/11.6 |
| 2005/0194345 A1 * | 9/2005 | Beggins | 215/386 |
| 2007/0099539 A1 * | 5/2007 | Fullmer | 446/369 |
| 2009/0025648 A1 * | 1/2009 | Simon | 119/707 |
| 2009/0255482 A1 * | 10/2009 | Santarsiero | 119/707 |
| 2010/0251966 A1 * | 10/2010 | Benson | 119/51.01 |
| 2010/0326369 A1 * | 12/2010 | Freeman et al. | 119/709 |

* cited by examiner

*Primary Examiner* — Kristen C Hayes
(74) *Attorney, Agent, or Firm* — Eckert Seamans Cherin & Mellott, LLC; Brij K. Agarwal

(57) ABSTRACT

A multi-material pet toy includes a first member having an attractant for making the multi-material pet toy interesting to a pet and a second member for protecting the first member to lengthen a serviceable life of the first member. The toy may be configured so that the first member includes a sound-producing member for making a noise without air movement passing through the sound-producing member, and the second member includes a protective member for protecting the sound-producing member. The toy may also be configured so that the first member includes a mouth-feel member for providing attraction for the pet with the noise of air movement passing through the mouth-feel member, and the second member includes a protective member for protecting the mouth-feel member.

7 Claims, 6 Drawing Sheets

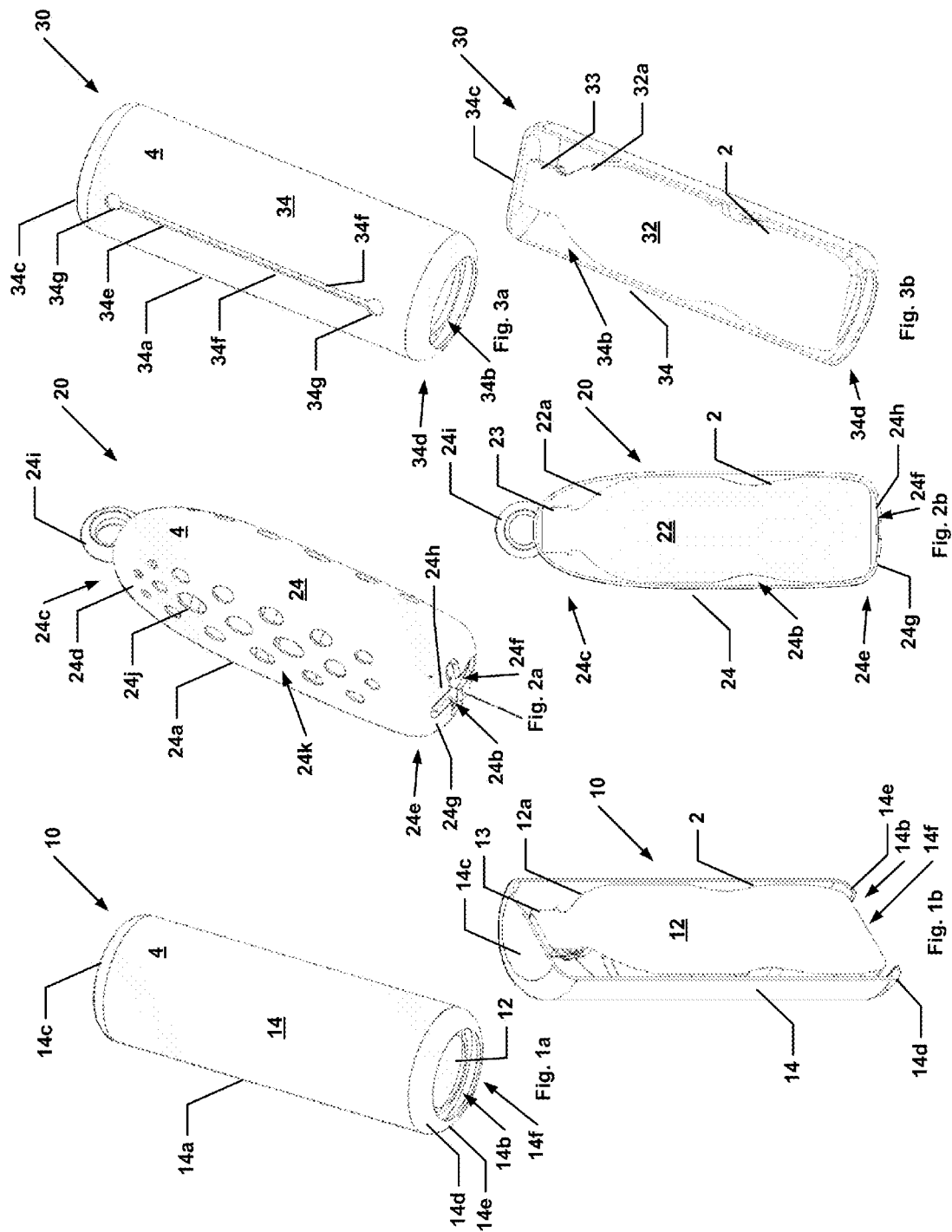

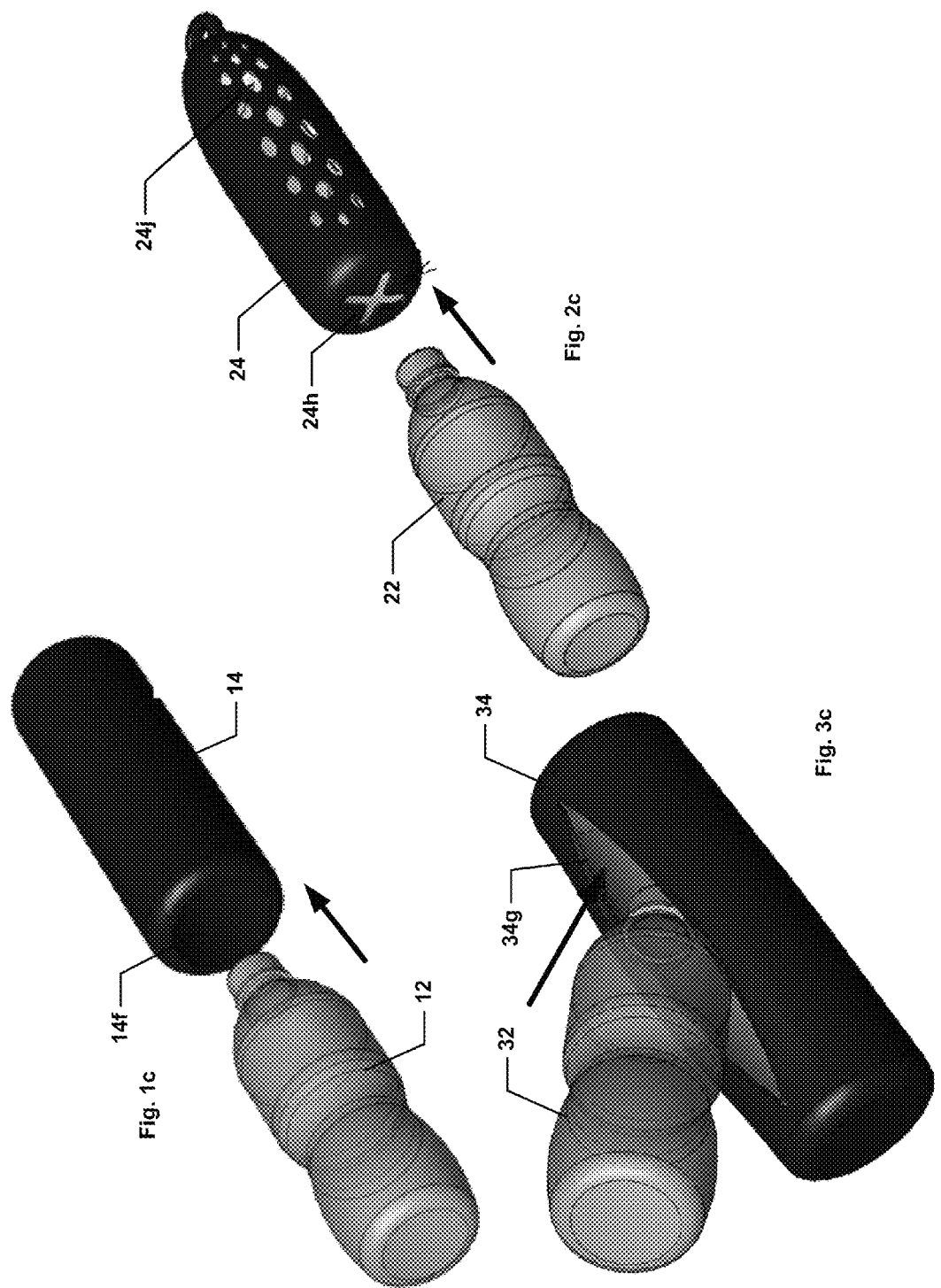

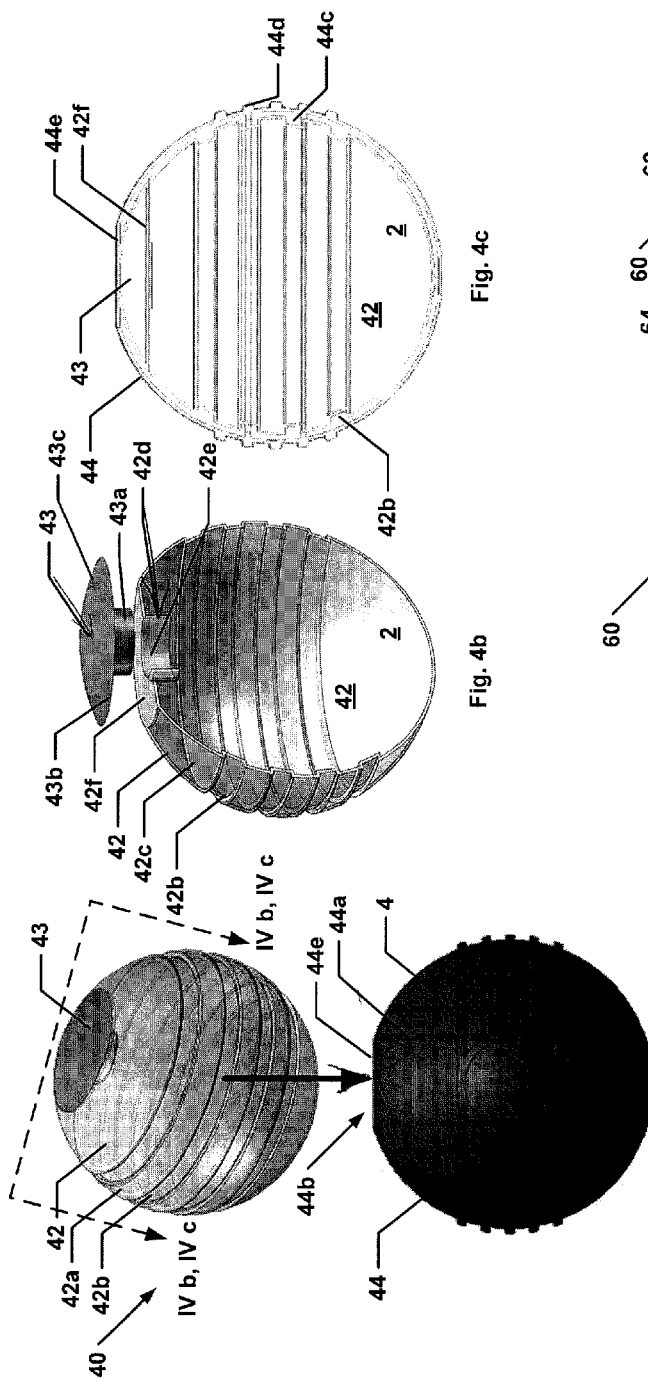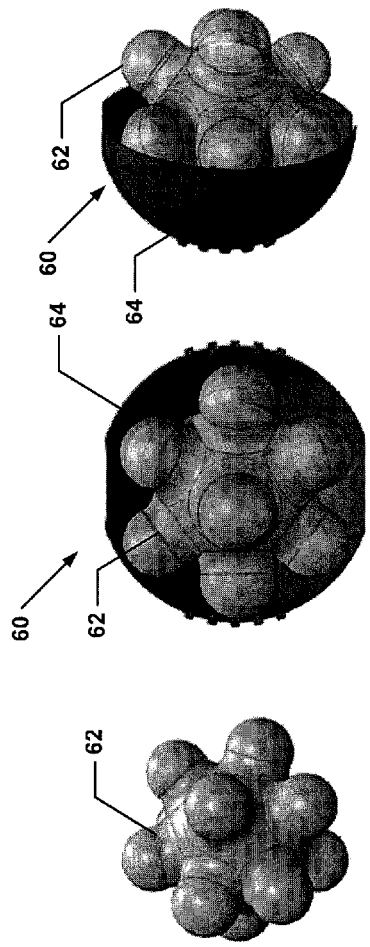

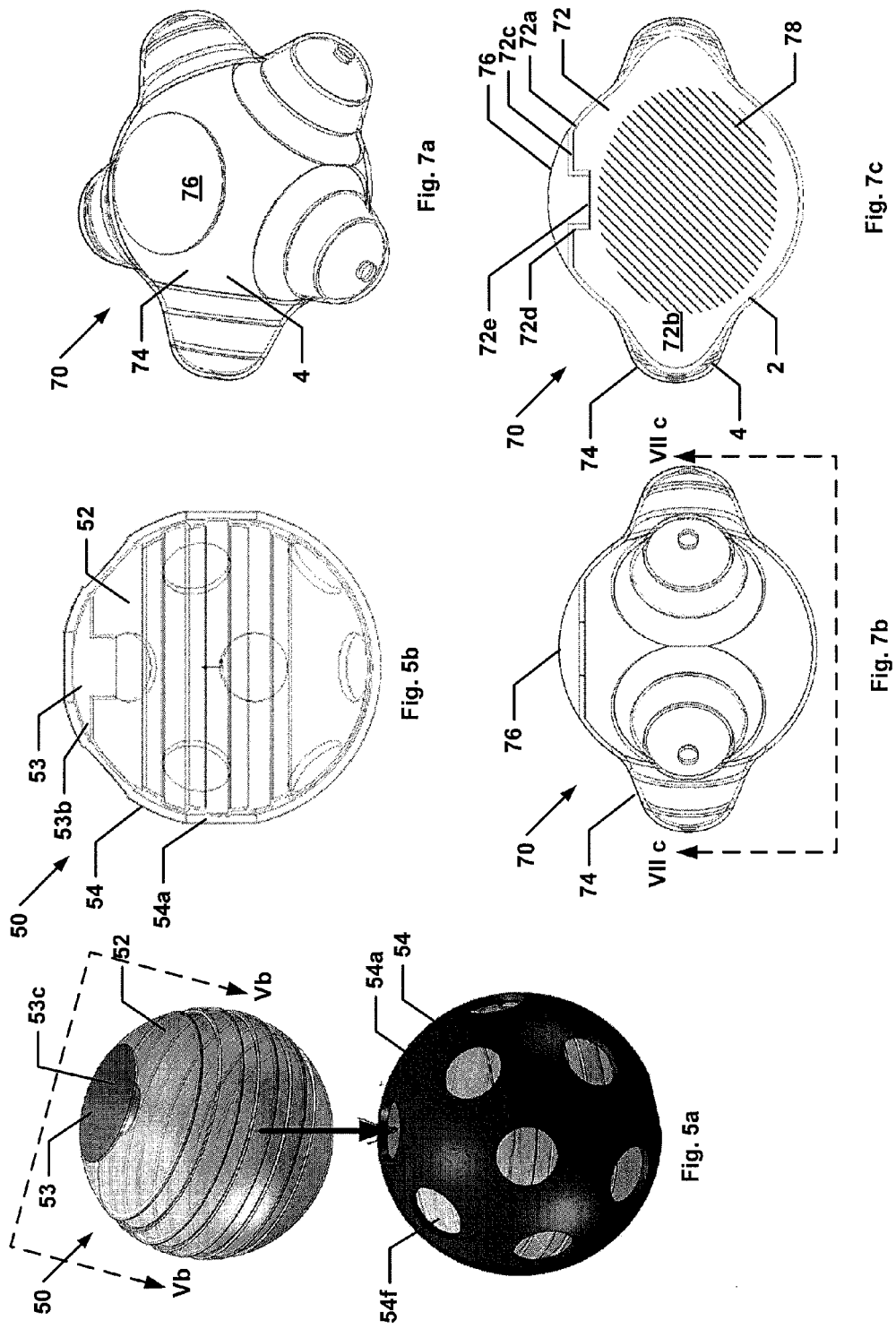

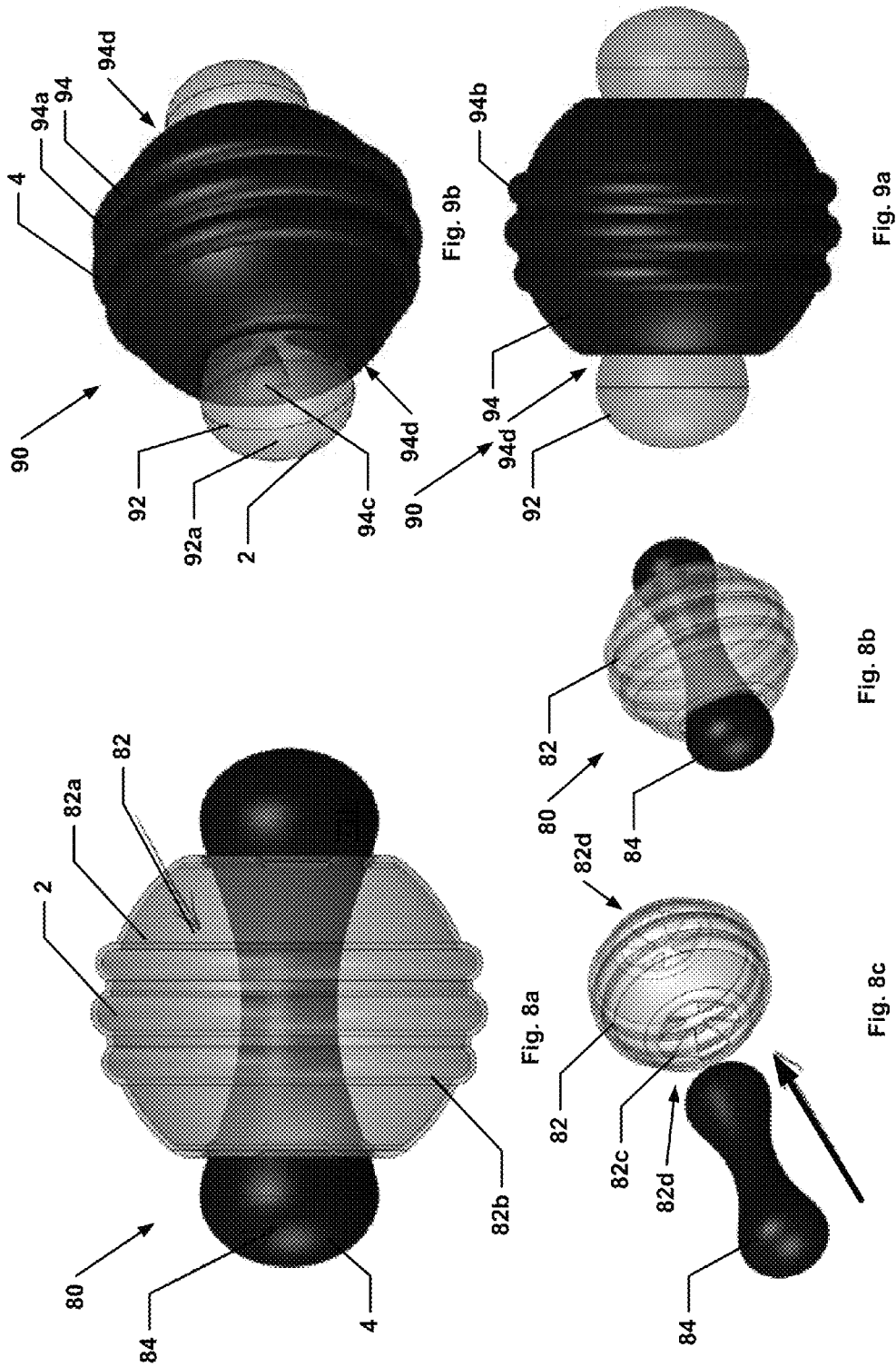

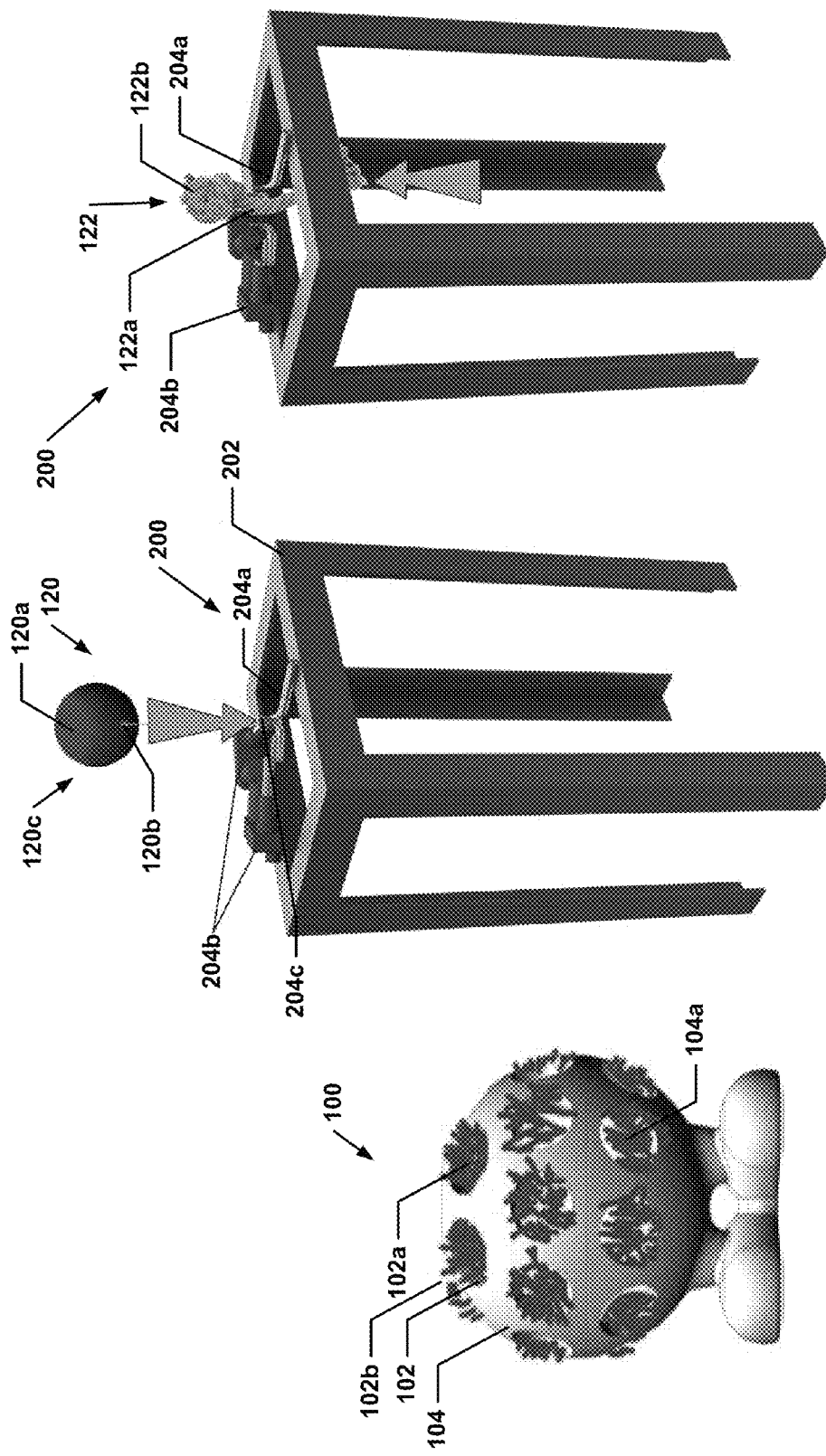

US 8,960,130 B2

PET TOY

CROSS-REFERENCE TO RELATED APPLICATIONS

This application is a non-provisional counterpart to and claims priority from U.S. Ser. No. 61/301,728, filed Feb. 5, 2010, which is incorporated hereby in its entirety for all purposes.

BACKGROUND OF THE INVENTION

1. Field of the Invention

The invention relates to one or more pet toys having at least two different materials.

2. Discussion of the Related Art

Pets, such as dogs and cats, are naturally curious; yet, to keep pets interested in toys an attractant is incorporated in the toy. One of the most common attractant is a sound-producing member, especially a squeaker.

Squeakers create interest in pet toys but produce a sharp, sudden sound that some pet owners find unpleasant. Mounting a squeaker may be a laborious and costly production step. That step is often for nil as certain aggressive pets seek out the squeaker and attempt to bite it from the toy. Once the squeaker is removed, the toys attractiveness is changed.

What is desired is a toy having an attractant that is easily and economically replaceable.

SUMMARY OF THE INVENTION

These and other needs are met by the present invention. Therein, a multi-material pet toy includes at least a sound-producing member made of a first material that preferably is blow-moldable and a second, protective, member comprising a second material that lengthens the serviceable life of the first material so that the serviceable life of the multi-material pet toy is also lengthened.

BRIEF DESCRIPTION OF THE DRAWINGS

FIG. 1a is a perspective view of a multi-material pet toy in accordance with one or more embodiments of the present invention.

FIG. 1b is a cross-sectional view of the multi-material pet toy of FIG. 1a.

FIG. 1c is a schematic view of the use of the multi-material pet toy of FIG. 1a.

FIG. 2a is a perspective view of a multi-material pet toy in accordance with one or more embodiments of the present invention.

FIG. 2b is a cross-sectional view of the multi-material pet toy of FIG. 2a.

FIG. 2c is a schematic view of the use of the multi-material pet toy of FIG. 2a.

FIG. 3a is a perspective view of a multi-material pet toy in accordance with one or more embodiments of the present invention.

FIG. 3b is a cross-sectional view of the multi-material pet toy of FIG. 3a.

FIG. 3c is a schematic view of the use of the multi-material pet toy of FIG. 3a.

FIG. 4a is an exploded perspective view of a multi-material pet toy in accordance with one or more embodiments of the present invention.

FIG. 4b is an exploded cross-sectional view of the multi-material pet toy of FIG. 4a.

FIG. 4c is a cross-sectional view of the multi-material pet toy of FIG. 4a.

FIG. 5a is an exploded perspective view of a multi-material pet toy in accordance with one or more embodiments of the present invention.

FIG. 5b is a cross-sectional view of the multi-material pet toy of FIG. 5a.

FIG. 6a is a perspective view of a sound-producing member of a multi-material pet toy in accordance with one or more embodiments of the present invention.

FIG. 6b is a partial cross-sectional view of a multi-material pet toy having the sound-producing member of FIG. 6a.

FIG. 6c is a partial perspective cross-sectional view of a multi-material pet toy having the sound-producing member of FIG. 6a.

FIG. 7a is a perspective view of a multi-material pet toy in accordance with one or more embodiments of the present invention.

FIG. 7b is a front view of the multi-material pet toy of FIG. 7a.

FIG. 7c is a cross-sectional view of the multi-material pet toy of FIG. 7a.

FIG. 8a is a front view of a multi-material pet toy in accordance with one or more embodiments of the present invention.

FIG. 8b is a view of the use of the multi-material pet toy of FIG. 8a.

FIG. 8c is a perspective view of the multi-material pet toy of FIG. 8a.

FIG. 9a is a front view of a multi-material pet toy in accordance with one or more embodiments of the present invention.

FIG. 9b is a perspective view of the multi-material pet toy of FIG. 9a.

FIG. 10 is front view of a multi-material pet toy in accordance with one or more embodiments of the present invention.

FIGS. 11a and 11b are a perspective view of a fixture making a multi-material pet toy in accordance with one or more embodiments of the present invention.

DETAILED DESCRIPTION OF THE INVENTION

Reference will now be made in detail to several views of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

In accordance with one or more embodiments of the present invention, a multi-material pet toy is suitable for playing by a pet, such as a dog. The multi-material pet toy includes at least a first member that comprises an attractant that makes the multi-material pet toy interesting to pets and a second member that preferably lengthens the serviceable life of the first member due to the material from which it is made so that the serviceable life of the multi-material pet toy is also lengthened. An attractant may be a sound-producing material, a sound-producing member, and/or a sound-producing structure; and/or a mouth-feel material, a mouth-feel member, and/or mouth-feel structure that alone or in combination with the material of the second member produces a feeling in the pet's mouth that encourages the pet to play with the multi-material pet toy.

In accordance with one or more embodiments of the present invention, the multi-material pet toy includes at least a sound-producing member made of a first material 2 that preferably is blow-moldable and a second, protective, member comprising a second material 4 that lengthens the serviceable life of the first material so that the serviceable life of the multi-material pet toy is also lengthened.

The toy includes a sound-producing member that is functional as an attractant to pets, such as dogs, and that provides significant advantages over sound-producing members or other attractants known in the art. First, it does not rely on air movement through the sound-producing member and, thus, does not emit sudden high-pitched squeaks as are common to squeakers. Second, the sound-producing member when engaged by an animal make a sound having a crinkling, crackling, and/or rustling characteristic that is of greater and longer lasting interest by animals, especially dogs. Third, the volume and resonance of the sound of the sound-producing member when engaged by animal is deeper and less intrusive than sounds produced by reed-based squeakers. Fourth, the sound-producing member that is either freely available or is economical to produce, and, thus, easily replaceable when damaged. Fifth, when both the sound-producing member and the protective member are exposed, the difference in material between the two members additionally provides an attraction to pets due to the different textures and giving a particular contrasting or complementary mouth-feel.

Moreover, using a second protective member provides that when the sound producing member is damaged, pieces of the sound-producing member are preferably retained within the second member.

The first material may be a blow-moldable material that which when chewed or played with by a dog or other animal makes a sound having a crinkling, crackling, and/or rustling characteristic. When objects having crinkling, crackling, and/or rustling noise characteristic are handled or engaged by animals, such as dogs, the crinkling, crackling, and/or rustling noise characteristics enhance interest in the object and lengthen the interaction with the object, possibly because it resembles prey animals rustling through leaves and evokes a chasing and/or hunting instinct in dogs.

The sound-producing member is preferably sealed with a cap or others suitable closure and retains at least ambient pressure within the sound-producing member to prevent the sound-producing member from collapsing when chewed or otherwise engaged by the pet. The sound-producing member may also be filled with air or any kind of a fillable material, which may be a fibrous or shredded polymer, beyond ambient pressure, i.e., in range from 1 atmosphere to 3.0 atmosphere, preferably in a range 1.2 to 1.5 atmosphere, to provide greater stability of the sound producing member, resistance, and playability for the toy.

Preferably, first material 2 is a thermoplastic polymer resin as are commonly used in beverage, food, and other types of containers and/or plastic wrap that have a crinkling, crackling, and/or rustling characteristic and, are preferably, thermoformable, such polyethylene terephthalate, i.e., "PET." However, first material 2 may also be high density polyethylene (HDPE), low density polyethylene (LDPE), polyethylene terephthalate: polyvinyl chloride, polypropylene, polystyrene fluorine treated HDPE, post consumer resin (PCR), or K-resin SBC.

Preferably, the second material 4 is a protective material that material that lengthens the serviceable life of the first material so that the serviceable life of the multi-material pet toy is also lengthened. The second material may be a vinyl, natural and/or synthetic rubber, and/or any other type of elastomeric material or materials. The second material is preferably moldable material and may also be overmolded as taught further herein. The second material preferably also has a hot-tear resistance suitable for inserting the member made of the first material, but not tearing.

In addition to the first and second materials, other materials are also intended to be incorporated to add interest or challenge to the multi-material pet toy and/or act to alter, enhance, and/or change the sound and/or other quality of the sound producing material.

FIG. 1a is a perspective view of a multi-material pet toy in accordance with one or more embodiments of the present invention. FIG. 1b is a cross-sectional view of the multi-material pet toy of FIG. 1a. FIG. 1c is a schematic view of the use of the multi-material pet toy of FIG. 1a. In accordance with one or more embodiments of the present invention, a multi-material pet toy 10 comprises a sound-producing member 12 and a sleeve 14 for removably receiving sound-producing member 12.

Sound-producing member 12 comprises first material 2 and may be in the form of a bottle 12a. A bottle cap 13 remains affixed to bottle 12a to maintain at least ambient pressure within the sound-producing member to prevent the sound-producing member from collapsing when chewed or otherwise engaged by the pet. The sound-producing member may also be filled beyond ambient pressure, i.e., in range from 1 atmosphere to 3.0 atmosphere, preferably in a range 1.2 to 1.5 atmosphere, to provide greater resistance and playability for the toy.

The closure of the sound-producing member also provides a low resonance of the sound-producing member. Cap 13 may be made of a different or like material as material 2.

Bottle 12a and cap 13 may be any bottle typically used in commerce for the sale and/or use of water, soda, juice et al., such a bottle may be one as shown in U.S. Pat. Nos. D591610 or D419882, which are hereby incorporated by reference. Typically, such bottles include an ergonomic portion.

In use, when a pet chews on or plays with sound-producing member 12, sound-producing member 12 makes a sound having a crinkling, crackling, and/or rustling characteristic. However, due to the thin wall construction of bottle 12a, the bottle, i.e., sound-producing member 12 becomes easily damaged.

To prolong its service life as a pet toy, sound-producing member 12 is removably insertable into sleeve 14; therein, preferably the sound-producing member is inserted so that cap 13 is inserted first into sleeve 14. Sleeve 14 resists tearing and reduces damage to sound-producing member 12, while at the same time permitting the crinkling, crackling, and/or rustling noise characteristics of sound-producing member 12 to be audible by the pet without undue sound deadening.

Sleeve 14 comprises second material 4, and preferably is molded of natural rubber and/or other elastomeric material that is suitably stretchable to removably receive sound-producing member 12. Sleeve 14 includes a body 14a of any shape, such as the illustrated oblong body, having an inner space 14b to suitable retain sound-producing member 12 without play.

The body comprises a closed end 14c and open end 14d that receives sound-producing member 12. A retaining rim 14e is formed to retain sound-producing member 12 in sleeve 14 and retaining rim 14e forms a periphery defining opening 14f.

Preferably, body 14a has a cylindrical outer shape and a cylindrical inner shape to accommodate bottle 12a without necessarily comprising an inner contoured surface that mates with the exact shape of bottle 12a and/or cap 13.

To accommodate a standard water 16.9 fluid ounce water bottle, sleeve 14 may comprise a length of 8.5 inches from closed end to open end as measured on the exterior of sleeve 14, a diameter of 2.8 inches as measured on the exterior of sleeve 14, and a wall thickness of 3-9 mm depending on the size and aggressiveness of the intended dog. Opening 14f may have a diameter of 2.0 inches.

Sleeve 14 may be sold in commerce by itself with instructions for a pet owner to utilize a used, empty water or soda bottle 12a. Thus, the owner would then insert the bottle via opening 14d into the sleeve until the cap is disposed against the closed end and/or the retaining rim holds the bottle in place.

When the sound-producing member has been damaged, the owner may remove the damaged bottle by pulling it through the opening 14f and insert a new replacement bottle. Advantageously, sleeve 14 retains the damaged first member 12 in the sleeve and, thus, avoids creating a mess.

In commerce, sleeve 14 may be sold in various sizes for use with various size bottles and the same size sleeve may be sold in varying wall thicknesses to accommodate dogs of various sizes and bite aggressiveness.

In commerce, sleeve 14 may sold in a kit with polyfill of any suitable kind and instructions to insert the polyfill in the sound-producing member to increase the various sound properties, especially to produce a deeper and richer sound. In addition or instead, the polyfill material preferably serves to stabilize the inner space of the sound producing member to prevent collapse of the sound producing member. Rather than using a polyfill material, any other suitable material may be used instead of polyfill material for the same purposes.

FIG. 2a is a perspective view of a multi-material pet toy in accordance with one or more embodiments of the present invention. FIG. 2b is a cross-sectional view of the multi-material pet toy of FIG. 2a. FIG. 2c is a schematic view of the use of the multi-material pet toy of FIG. 2a. In accordance with one or more embodiments of the present invention, a multi-material pet toy 20 is configured similarly to multi-material pet toy 10, but includes further improvements. Therein, multi-material pet toy 20 comprises a sound-producing member 22 and a sleeve 24 for removably receiving sound-producing member 22.

Sound-producing member 22 may be configured similarly to sound-producing member 12 and, thus, comprises first material 2, which may be in the form of a bottle 22a, and a bottle cap 23 affixed to bottle 22a. Cap 23 may be made of a different or like material as material 2.

In use, when a pet chews on or plays with sound-producing member 22, sound-producing member 22 makes a sound having a crinkling, crackling, and/or rustling characteristic. However, due to the thin wall construction of bottle 22a, the bottle, i.e., sound-producing member 22 becomes easily damaged.

To prolong its service life as a pet toy, sound-producing member 22 is removably insertable into sleeve 24; therein, preferably the sound-producing member is inserted so that the cap is inserted first into the sleeve. Sleeve 24 resists tearing and reduces damage to sound-producing member 22, while at the same time permitting the crinkling, crackling, and/or rustling noise characteristics of sound-producing member 22 to be audible by the pet without undue sound deadening.

Sleeve 24 comprises second material 4, and preferably is molded of natural rubber and/or other elastomeric material that is suitably stretchable to receive sound-producing member 22. Sleeve 24 includes a body of any shape, such as the illustrated oblong buoy-style body 24a, having an inner space 24b to suitable retain sound-producing member 22 without play. The body comprises a tip portion 24c having a closed end 24d having a rounded conical shape and a bottom portion 24e having an open end 24f that receives sound-producing member 22.

A retaining rim 24g is formed and one or more flaps 24h extend from the retaining ring. The retaining ring and one or more flaps retain sound-producing member 22 in sleeve 24. The one or more flaps are able to be flexibly folded during insertion or removal of sound-producing member 22.

To aid in handling sleeve 24, a grip portion 24i, which may be in any form such as a ring that is preferably integral with the sleeve. When a used sound-producing member 22 is to be removed by the user, the user grabs the ring and removes it by pulling on the grip portion.

Since body 24a may deaden the sound, body 24a comprises one or more apertures 24j that reduce sound deadening. Preferably, apertures 24j are oval in shape to provide an attractive appearance and arranged in one or more groupings 24k comprising one or more apertures 24j of varying sizes. Each grouping 24k may be disposed on approximately one fourth of the outer surface in a longitudinal arrangement from tip portion to bottom portion and be spaced-apart from another grouping so that the toy comprises portions where the animal can have direct contact with sound-producing member 22 and feel an interaction.

Sleeve 24 may be similarly sized as sleeve 14 and have a similar wall thickness. Sleeve 24 may be sold in commerce by itself with instructions for a pet owner to utilize a used, empty water or soda bottle 22a. Thus, the owner would then insert the bottle via open end 24f into the sleeve until the cap is disposed against the closed end and/or the retaining rim holds the bottle in place.

When the sound-producing member has been damaged, the owner may remove the damaged bottle by pulling it through open end 24f and insert a new replacement bottle.

In commerce, sleeve 24 may be sold in various sizes for use with various size bottles and the same size sleeve may be sold in varying wall thicknesses to accommodate dogs of various sizes and bite aggressiveness. Advantageously, the one or more apertures also permit a purchaser of the multi-material pet toy to see the sound-producing member or a representation of the sound-producing member grasp the intended use of the toy when considering the purchase.

In one embodiment, substantially all of sleeve 24 excluding the tip portion and bottom portion includes one or more apertures 24h.

FIG. 3a is a perspective view of a multi-material pet toy in accordance with one or more embodiments of the present invention. FIG. 3b is a cross-sectional view of the multi-material pet toy of FIG. 3a. FIG. 3c is a schematic view of the use of the multi-material pet toy of FIG. 3a. In accordance with one or more embodiments of the present invention, a multi-material pet toy 30 is configured similarly to multi-material pet toy 10, but includes further improvements. Therein, multi-material pet toy 30 comprises a sound-producing member 32 and a sleeve 34 for removably receiving sound-producing member 32

Sound-producing member 32 may be configured similarly to sound-producing member 12 and, thus, comprises first material 2, which may be in the form of a bottle 32a and a bottle cap 33 affixed to bottle 32*a*. Cap 33 may be made of a different or like material as material 2.

Sleeve 34 comprises second material 4, and preferably is molded of natural rubber and/or other elastomeric material that is suitably stretchable to receive sound-producing member 32. Sleeve 34 includes a body of any shape, such as the illustrated oblong body 34*a*, having an inner space 34*b* to suitable retain sound-producing member 32 without play. The body comprises a top portion 34*c* having a closed end and a bottom portion 34*d* having closed end or an open end as taught.

The body comprises a longitudinal slot 34*e* having lip portions 34*f* that are slightly spaced-apart for easier grasping by a user and cutouts 34*g* that prevent tearing of the slot. The sound-producing member 22 is inserted through the slot into inner space 34*b*.

Since body 34*a* may deaden the sound, body 34*a* comprises one or more apertures such as apertures 24*j* that reduce sound deadening and are grouped together as taught above.

Sleeve 34 may be similarly sized as sleeve 14 and have a similar wall thickness. Sleeve 34 may be sold in commerce by itself with instructions for a pet owner to utilize a used, empty water or soda bottle 32*a*. Thus, the owner would then insert the bottle via slot 34*e* into the sleeve until the cap is disposed securely in the sleeve; therein, preferably the sound-producing member is inserted so that the cap is inserted first into the sleeve.

When the sound-producing member has been damaged, the owner may remove the damaged bottle by pulling it through the slot and insert a new replacement bottle.

In commerce, sleeve 34 may be sold in various sizes for use with various size bottles and the same size sleeve may be sold in varying wall thicknesses to accommodate dogs of various sizes and bite aggressiveness. Advantageously, the one or more apertures also permit a purchaser of the multi-material pet toy to see the sound-producing member or a representation of the sound-producing member grasp the intended use of the toy when considering the purchase.

FIG. 4*a* is an exploded perspective view of a multi-material pet toy in accordance with one or more embodiments of the present invention. FIG. 4*b* is an exploded cross-sectional view of the multi-material pet toy of FIG. 4*a*. FIG. 4*c* is a cross-sectional view of the multi-material pet toy of FIG. 4*a*. FIG. 4*d* is a cross-sectional view of the multi-material pet toy of FIG. 4*a* more clearly illustrating that the sound producing member and sleeve are held without play to provide an intimate adjacent contact.

In accordance with one or more embodiments of the present invention, a multi-material pet toy 40 comprises a sound-producing member 42 and a sleeve 44 that receives sound-producing member 42.

Sound-producing member 42 comprises first material 2, which may be in any suitable shape having a body 42*a* and a cap 43 affixed to the body to seal the sound-producing member 42. Cap 43 may be made of a different or like material as material 2. By sealing the sound-producing member, the volume of noise originating from the sound-producing member is lessened and the crinkling, crackling, and/or rustling noise characteristic is placed in the lower range increasing the attractive quality for animals and making the toy more pleasant for the animal's owner.

Preferably, sound-producing member 42 includes one or more retention structures 42*b* having any suitable shape to retain the sound-producing member in the same position relative to the sleeve. The one or more retention structures 42*b* may comprise one or more partial or complete circumferential bands that are indented or extended relative to a surface 42*c* of the sound-producing member.

Preferably, cap 43 comprises an extension 43*a*, a brim 43*b*, and an arcuate top surface 43*c*. Extension 43*a* is received in a sleeve 42*d* defining an aperture 42*e* in a flattened top portion 42*f* of the body of the sound-producing member. During manufacture cap 43 is preferably glued onto top portion 42*f* trapping ambient air at ambient pressure in the body of the sound-producing member.

Sleeve 44 comprises second material 4, and preferably is molded of natural rubber and/or other elastomeric material that is suitably stretchable to receive sound-producing member 42. Sleeve 44 includes a body of any shape, such as the illustrated rounded body 44*a*, having an inner space 44*b* to suitably retain sound-producing member 42 without play.

To aid in retention of sound-producing member 42, an inner surface 44*c* of body 44*a* comprises one or more respective retention structures 44*d* that mate with one or more retention structures 42*b* to hold the sound-producing member in the same position relative to the sleeve, e.g., hold the sleeve sound-producing member stationary relative to the sound-producing member.

FIG. 4*d* is a cross-sectional view of the multi-material pet toy of FIG. 4*a*. FIG. 4*d* more clearly illustrates that sound producing member 42 and sleeve 44 are held without play to provide an intimate adjacent contact between surface 42*c* of the exterior of inner surface 44*c* of the sleeve 44.

The body comprises an open portion 44*e* that preferably is smaller than cap 43 so that the cap is maintained safely below an edge of the open portion. However, the cap may also be smaller than the opening for ease of assembly and/or durability of the sound-producing member. Preferably, the second material has sufficient hot tear resistance to permit stretching to insert the sound-producing member and subsequent return to a smaller state wherein open portion 44*e* is smaller than cap 43.

However, even more preferably, second material 4 comprises the ability to stretch even when not hot in order to remove a damaged and/or used sound-producing member and insert a new sound-producing member and the material's subsequent return to a smaller state wherein open portion 44*e* is smaller than cap 43.

When the sound-producing member has been damaged, the owner may remove the damaged bottle by pulling it through open end 24*f* and insert a new replacement bottle.

In commerce, multi-material pet toy 40 may be sold in various sizes and with varying wall thicknesses of sleeve 44 to accommodate dogs of various sizes and bite aggressiveness.

FIG. 5*a* is an exploded perspective view of a multi-material pet toy in accordance with one or more embodiments of the present invention. FIG. 5*b* is a cross-sectional view of the multi-material pet toy of FIG. 5*a*. In accordance with one or more embodiments of the present invention, a multi-material pet toy 50 similar to multi-material pet toy 40. Thus, multi-material pet toy 50 comprises a sound-producing member 52 and a sleeve 54 that receives sound-producing member 52. A cap 53 having an extension 53*a* disposed in sound-producing member 52, a brim 53*b*, and an arcuate top surface 53*c*, seals sound-producing member 52.

However, sleeve body 54*a* comprises one or more apertures such as apertures 54*f* that reduce sound deadening and are grouped together as taught above. Preferably, apertures 54*f* are preferably circular or oval in shape to provide an attractive appearance and may be arranged in one or more groupings comprising one or more apertures of varying sizes.

Each grouping may be disposed on approximately one fourth of the outer surface so that the toy comprises portions where the animal can have direct contact with sound-producing member 52 and feel an interaction.

Advantageously, the one or more apertures also permit a purchaser of the multi-material pet toy to see the sound-producing member and grasp the intended use of the toy when considering the purchase.

FIG. 6a is a perspective view of a sound-producing member of a multi-material pet toy in accordance with one or more embodiments of the present invention. FIG. 6b is a partial cross-sectional view of a multi-material pet toy having the sound-producing member of FIG. 6a. FIG. 6c is a partial perspective cross-sectional view of a multi-material pet toy having the sound-producing member of FIG. 6a. In accordance with one or more embodiments of the present invention, a multi-material pet toy 60 similar to multi-material pet toy 40. Thus, multi-material pet toy 60 comprises a sound-producing member 62 and a sleeve 64 that receives sound-producing member 62.

However, sound-producing member 62 has a body shape that does not match the shape of sleeve 64. Therein, retention structures are not necessary. Preferably, sleeve 60 includes a wall thickness that is suitable to maintain the shape of the body.

FIG. 7a is a perspective view of a multi-material pet toy in accordance with one or more embodiments of the present invention. FIG. 7b is a front view of the multi-material pet toy of FIG. 7a. FIG. 7c is a cross-sectional view of the multi-material pet toy of FIG. 7a. In accordance with one or more embodiments of the present invention, a multi-material pet toy 70 comprises a sound-producing member 72, a sleeve 74 which is overmolded onto the sound-producing member, and a cap 76.

Sound-producing member 72 comprises first material 2, which may be in any suitable shape 72a, including the multiple arm structure depicted, which is substantially hollow and has an inner space 72b. A sleeve 74 is overmolded onto sound-producing member 72 and comprises a first material 4. A portion of sound-producing member 72 comprises a flattened area 72c and a retaining structure 72d defining an aperture 72e. These may also be overmolded by the sleeve.

Preferably, cap 76 is made of any suitable material comprises an extension 76a that is received in aperture 72e to secure the cap to the multi-material pet toy. Preferably, cap 76 is glued using any suitable adhesive.

By sealing the sound-producing member, the volume of noise originating from the sound-producing member is lessened and the crinkling, crackling, and/or rustling noise characteristic is placed in the lower range increasing the attractive quality for animals and making the toy more pleasant for the animal's owner.

To increase the various sound properties, the inner space of the sound-producing member may be filled with a polyfill material 78 of any suitable kind to produce a deeper and richer sound. In addition or instead, polyfill material 78 preferably serves to stabilize the inner space of the sound producing member to prevent collapse of the sound producing member. Rather than using a polyfill material, any other suitable material may be used instead of polyfill material 78 for the same purposes.

FIG. 8a is a front view of a multi-material pet toy in accordance with one or more embodiments of the present invention. FIG. 8b is a view of the use of the multi-material pet toy of FIG. 8a. FIG. 8c is a perspective view of the multi-material pet toy of FIG. 8a. In accordance with one or more embodiments of the present invention, a multi-material pet toy 80 comprises a first body 82 made of material 2 into which a second body 84 made of material 4 is inserted.

Preferably, body 82 is hollow and may comprise any suitable shape 82a, which may include decorations 82b that aid in handling multi-material pet toy 80. One or more flaps 82c are disposed at one or more open ends 82d.

Second body 84 comprises any suitable shape 84a and is a substantially hollow member. It may be closed and contain one or more squeakers through which ambient air passes. In the alternative, second body 84 may have an air hole and lack a squeaker.

In use, second body 84 is inserted through one or more open ends 82d into an inner space of body 82. Flaps 82c deform and preferably hold the second body in place relative to first body 82. When the animal has played with multi-material pet toy 80 and the first body has been damaged beyond use, a new replacement first body 82 may be purchased. The second body is removed by pulling it from the used first body 82 and second body 84 is then inserted into the new first body 82.

FIG. 9a is a front view of a multi-material pet toy in accordance with one or more embodiments of the present invention. FIG. 9b is a perspective view of the multi-material pet toy of FIG. 9a. In accordance with one or more embodiments of the present invention, a multi-material pet toy 90 comprises a first body 92 made of material 2 into which a second body 94 made of material 4 is inserted.

Preferably, first body 92 comprises any suitable shape 92a and is a substantially hollow member. It may be closed and contain one or more squeakers through which ambient air passes. In the alternative, first body 92 may have an air hole and lack a squeaker.

Second body 94 is hollow and may comprise any suitable shape 94a, which may include decorations 94b that aid in handling multi-material pet toy 90. One or more flaps 94c are disposed at one or more open ends 94d.

In use, first body 92 is inserted through one or more open ends 94d into an inner space of body 94. Flaps 94c deform and preferably hold the first body in place relative to second body 94. When the animal has played with multi-material pet toy 90 and the first body has been damaged beyond use, a new replacement first body 92 may be purchased. The damaged first body is removed by pulling it from second body 94 and the new undamaged first body 92 is then inserted into second body 94.

FIG. 10 is front view of a multi-material pet toy in accordance with one or more embodiments of the present invention. In accordance with one or more embodiments of the present invention, a multi-material pet toy 100 is suitable for playing by a pet, such as a dog. The multi-material pet toy includes a first member 102, preferably an inner member, and a second member 104, preferably an outer member, that preferably protects the first member. The first member comprises one or more materials 102a that have a mouth-feel, i.e., is a mouth-feel member.

The multi-material pet toy provides significant advantages over other toys. First, the multi-material pet toy does not include a sound-producing member or air passing through it and, thus, does not emit sudden high-pitched squeaks as are common to squeakers, as an attractant for the pet. Second, the mouth-feel member is economical to produce, and, is easily replaceable when damaged. Third, when at least portions of the mouth-feel member and the outer member are exposed, the difference in material between the two members provides an attraction to pets due to the different textures of each member.

Moreover, using a second member provides that when the inner member is damaged, pieces of the inner member are preferably retained within the second member.

The mouth-feel material 102a of inner member 102 may be a plush fabric material, a canvass material, fur or fur-like material, and/or any other suitable material having a texture that produces a mouth-feel in the pet. The plush fabric material may be any suitable plush fabric material having any suitable deep or low pile or in between, fabric count, and be made of natural or synthetic material; but preferably are deep pile such that the pile comprise one or more portions 102b that extend through one or more openings 104a in the outer member for a superior mouth-feel. The fur or fur-like material may be natural or synthetic, and may comprise any length of fiber/hair length. Likewise, it is preferred that the fur fibers/hair comprise one or more portions 102b that extend through one or more openings 104a in the outer member for a superior mouth-feel.

The inner member may have any suitable shape that preferably is cooperative with one or more inner spaces of member 104. Member 102 may also be filled with a material, such as fibrous or shredded polymer, to provide greater resistance and playability for the toy.

The outer member 104 may be made of a vinyl, natural and/or synthetic rubber, and/or any other elastic material and may be overmolded or have another structure placed over it. The material from which the outer member is made preferably also has a hot-tear resistance suitable for inserting the member made of the first material, but not tearing. Member 104 may have any suitable shape, but preferably includes one or more holes 104a and one or more inner spaces 104b into which member 102 is inserted through one or more holes 104a or through a special opening (not shown) provided in member 104.

In use, multi-material pet toy 100 may be played with by a pet. Therein, portions 102b that extend through openings 104a provide an attractant mouth-feel for the pet.

FIGS. 11a and 11b are a perspective view of a fixture making a multi-material pet toy in accordance with one or more embodiments of the present invention. In accordance with one or more embodiments of the present invention, multi-material pet toy 10-100 may be made by hand. Therein, the sound-producing member, such as sound-producing member 12, 22, 32, 42, 52, 62, and 72 is received in the sleeve, such as sleeve 14, 24, 34, 44, 54, 64, and 74. While, for example, sleeve 34 comprises a longitudinal slot 34e that easily permits the sound producing member to be received in the inner space of sleeve 34, sleeves 54, 64, and 74 must be stretched to receive the sound-producing member. Therein, the second material 4 from which sleeves 54, 64, and 74 are made preferably comprise a suitable hot-tear resistance that permits the insertion of the respective sound producing member through a hole without tearing the respective sleeve and then returning the hole to substantially its pre-opened size.

This method may also be used for multi-material pet toy 100 wherein the inner member 102 is inserted into member 104.

The method may be improved by the use of a fixture 200. Fixture 200 comprises a framework 202 that provide an ergonomic and efficient working space and/or support. At least one fixed grasping unit 204a and one or more movable grasping units 204b work cooperatively to open a hole or aperture in a member or sleeve, such as those taught with respect to multi-material pet toy 10-100 or any other type of toy. Each grasping unit preferably has an L-shape, S-shape, or any other suitable shape for being disposed into the opening and extending into an inner space by securely retaining an edge of the opening or aperture. The movable grasping units 204b may be movable by linear actuators that are foot-controlled by user of the fixture.

In use, units 204a and 204b are first disposed so that the end portions 204c of each unit are proximate to each other and fit into the hole or aperture in the member or sleeve, such as those taught with respect to multi-material pet toy 10-100 or any other type of toy, and securely retain the edge of the opening or aperture. Movable units 204b then move distal from the portion 204c of unit 204a. This causes the opening or aperture to widen. A sound-producing member such as the one taught above, an inner member such as the one taught above, or any other type insert having a dimension or cross-sectional area that is wider than a dimension or planar or non-planar area of the hole or aperture is then inserted into the hole or aperture using a tool or other suitable device. Thereafter, the multi-material pet toy is pulled off the grasping units 204a and 204b or the movable grasping units are moved proximate to the fixed unit 204a and the hole or aperture returns to substantially its initial state and the toy is removed along with the now-mounted sound-producing member, inner member, and/or other insert.

The method may in addition be used to make a multi-material pet toy 120. Toy 120 may comprise a shell 120a having an opening 120b providing access to an inner space 120c. An insert 122 comprises a rope 122a having a knot 122b that is an insert into inner space 120c using the above method.

Each of the multi-material pet toy 10-120 may incorporate features of one or more of the other multi-material pet toys 10-120 and may be made as taught with respect to any other toy herein. For example, a wall thickness disclosed for one multi-material pet toy may be used with another multi-material pet toy. Similarly, decorations, apertures, materials chosen for making one embodiment, and/or fillable materials disclosed with one embodiment may be readily used with another.

While the invention has been described in conjunction with specific embodiments, it is to be understood that many alternatives, modifications, and variations will be apparent to those skilled in the art in light of the foregoing description.

The invention claimed is:

1. An apparatus usable as a noise making pet toy and comprising:
    a replaceable element that is hollow and that is structured to generate a noise upon being deformed, the replaceable element comprising a removable closure that is structured to seal an interior space in the replaceable element, and
    a hollow sleeve element having an interior region within which at least a portion of the replaceable element is removably retained, the at least portion of the replaceable element comprising at least the removable closure.

2. The apparatus of claim 1 wherein the sleeve element is elongated and includes a retaining element at an end thereof, the retaining element being structured to resist unintended removal of the replaceable element from the interior region.

3. The apparatus of claim 2 wherein the sleeve element includes a closed end opposite the retaining element against which the removable closure is disposed.

4. The apparatus of claim 1 wherein the sleeve element is elongated and includes a pair of closed ends, the removable closure being disposed against a closed end of the pair of closed ends.

5. The apparatus of claim 1 wherein the sleeve element has a plurality of apertures formed therein that are structured to communicate to the exterior of the sleeve element a noise from the replaceable element situated in the interior region.

6. The apparatus of claim 3 wherein the sleeve element further includes a grip portion that protrudes from the closed end and that is structured to be grasped by a user during removal of the replaceable element from the interior region.

7. The apparatus of claim 1 wherein the sleeve element and the replaceable element are elongated.

* * * * *